Aug. 2, 1938. P. H. SMYTH, JR Re. 20,818

SELECTIVE PHONOGRAPHIC PLAYING MACHINE

Original Filed Oct. 8, 1931 8 Sheets-Sheet 1

Aug. 2, 1938. P. H. SMYTH, JR Re. 20,818

SELECTIVE PHONOGRAPHIC PLAYING MACHINE

Original Filed Oct. 8, 1931 8 Sheets-Sheet 2

Inventor:
Paul H. Smyth, Jr.
By Samuel McBanning
Attorney

SELECTIVE PHONOGRAPHIC PLAYING MACHINE

Original Filed Oct. 8, 1931 8 Sheets-Sheet 3

Inventor:
Paul H. Smyth, Jr.,
By Samuel W. Banning
Attorney.

Aug. 2, 1938. P. H. SMYTH, JR Re. 20,818

SELECTIVE PHONOGRAPHIC PLAYING MACHINE

Original Filed Oct. 8, 1931 8 Sheets-Sheet 4

Inventor:
Paul H. Smyth, Jr.
By Samuel W. Banning
Attorney.

Aug. 2, 1938. P. H. SMYTH, JR Re. 20,818

SELECTIVE PHONOGRAPHIC PLAYING MACHINE

Original Filed Oct. 8, 1931 8 Sheets-Sheet 5

Inventor:
Paul H. Smyth, Jr.,
By Samuel W. Banning
Attorney.

SELECTIVE PHONOGRAPHIC PLAYING MACHINE

Original Filed Oct. 8. 1931 8 Sheets-Sheet 6

Inventor:
Paul H. Smyth, Jr.
By Samuel A. Deming
Attorney.

Aug. 2, 1938. P. H. SMYTH, JR Re. 20,818

SELECTIVE PHONOGRAPHIC PLAYING MACHINE

Original Filed Oct. 8, 1931 8 Sheets-Sheet 7

Inventor:
Paul H. Smyth, Jr.,
By Samuel L. Deming
Attorney.

Aug. 2, 1938.

P. H. SMYTH, JR

Re. 20,818

SELECTIVE PHONOGRAPHIC PLAYING MACHINE

Original Filed Oct. 8, 1931 8 Sheets-Sheet 8

Inventor:
Paul H. Smyth, Jr.
By Samuel W. Banning
Attorney.

Reissued Aug. 2, 1938

Re. 20,818

UNITED STATES PATENT OFFICE 20,818

SELECTIVE PHONOGRAPHIC PLAYING MACHINE

Paul H. Smyth, Jr., Evanston, Ill.

Original No. 2,004,016, dated June 4, 1935, Serial No. 568,610, October 8, 1931. Renewed November 24, 1936. Application for reissue May 20, 1937, Serial No. 143,864

71 Claims. (Cl. 274—10)

This invention relates to improvements in selective phonographic playing machines.

The present invention relates to that type of phonographic machines which are adapted to be loaded with a series of records and to be operated to play selected records or any selected record in the group, and after playing any record in the group, to restore that record to its position at the terminus of the cycle of operations.

The machine of the present invention is designed to provide a vertically adjustable turntable having a range of movements sufficient to permit it to engage and lift any one of the series of records which for the time being is presented to a position within the lifting range of the turntable, in conjunction with mechanism for swinging the carrier containing the selected record to a position for engagement by the turntable when lifted. This arrangement enables the swinging record holders to be selectively arranged in two groups on opposite sides of the turntable, and permits a selected record to be swung to the medial or central position, and to be engaged by the turntable and played, and thereafter restored by a swinging operation after the playing of the record has been concluded.

The arrangement is one which is intended to materially simplify the construction of the machine as a whole and to obviate the necessity for vertically moving a stack of records to bring the selected record into the plane of the turntable, as has been customary in certain previous constructions, thereby utilizing a minimum amount of power in the operation of the machine and simplifying the mechanical movements required in the performance of the cycle of operations.

Further objects and details will appear from a description of the invention in conjunction with the accompanying drawings, wherein.

Figure 1:
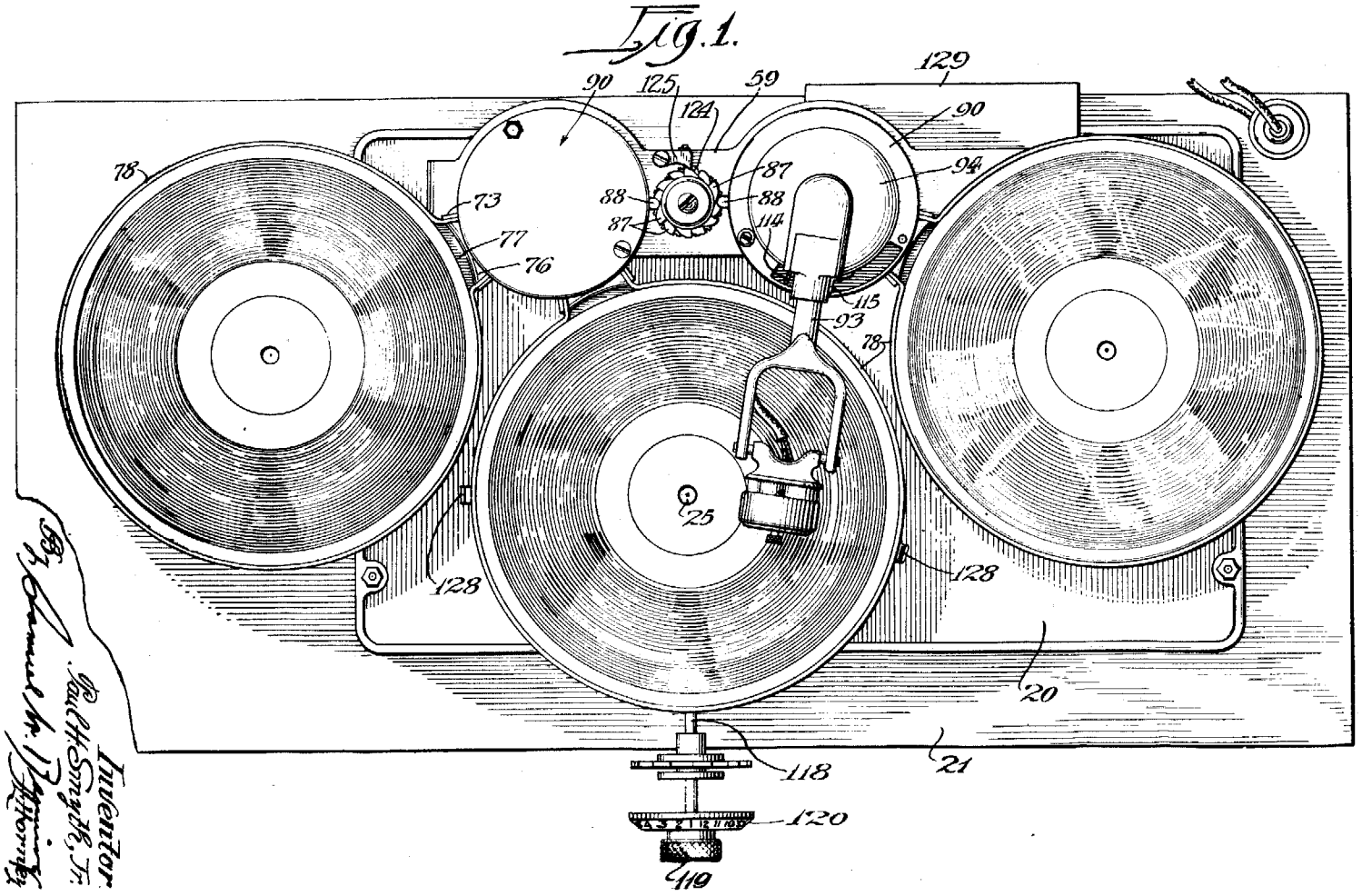
Figure 1 is a plan view of the machine as a whole, with the outer casing or cabinet removed.

The machine as a whole is mounted upon a base plate 20 carried by a board or other mounting 21. The base plate has mounted thereon a motor 22 for actuating the record carriers, and a motor 23 for rotating the turntable 24.

The turntable is mounted upon a vertical spindle 25 driven by a suitable train of connections from the motor 23, which motor is of the type ordinarily employed in the driving of phonographic turntables and which need not be here described in detail. The motor, together with the turntable, is carried by a platform 26, which is vertically adjustable and which in turn is mounted upon plunger rods 27 slidably mounted within spaced posts 28 which spring upwardly from feet 29 which are bolted to the base plate.

The arrangement is one which permits the platform, and with it the turntable and motor, to be moved vertically throughout a range of movements sufficient to engage any plate which may be selected from the series with which the machine is equipped.

Figure 4:
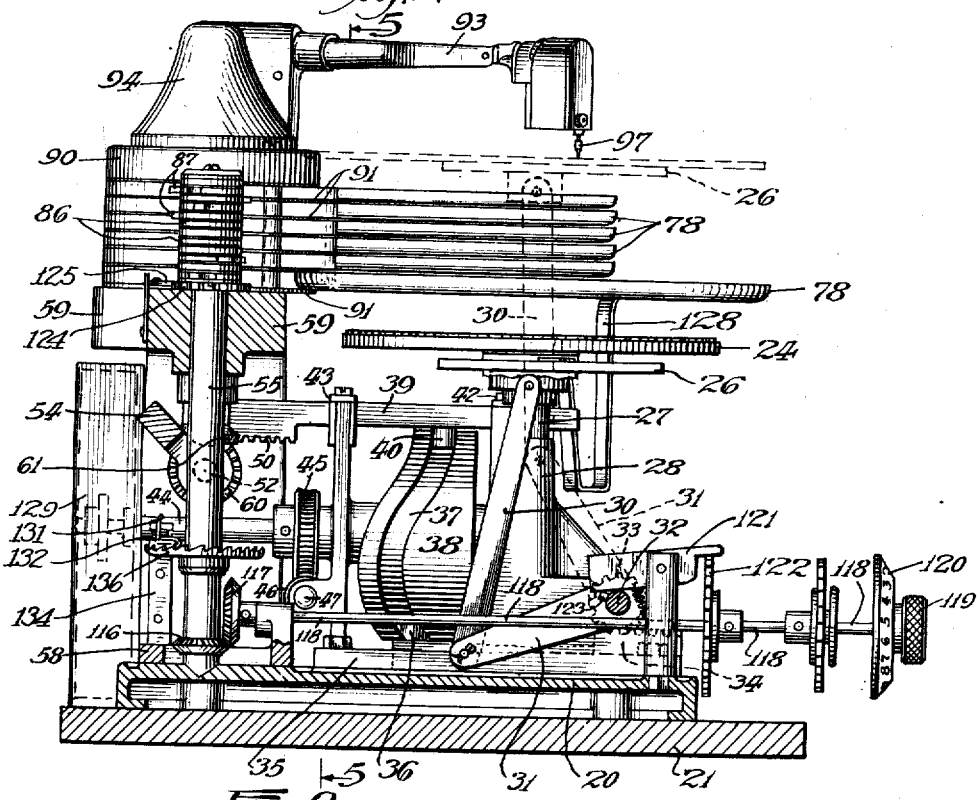
Fig. 4 is a cross sectional elevational taken on line 4—4 of Fig. 3.

The turntable platform 26 is vertically adjustable through the medium of links 30 (Fig. 4) which are pivoted at their upper ends to the platform, and at their lower ends to crank arms 31 which are keyed to a rock shaft 32, so that as the shaft is rotated, the turntable platform will be raised or lowered as the case may be.

The relation of the links and crank is such that the links, as they approach the limit of their upward thrust, will tend to come to a gradual stop which is important in effecting engagement between the needle and the record.

The racking movements of the shaft 32 are imparted thereto through a pinion 33 on the shaft, which pinion is in mesh with a sliding rack bar 34, which is keyed within a groove in a guide plate 35 secured to the base plate.

The rack bar 34 is provided with a pin or roller 36, which engages a groove 37 in a cam 38 of cylindrical form, which also controls the movement of a rack bar 39 provided with a pin or roller 40, and this rack bar 39 occupies a position above the rack bar 34 and is guided within grooves 41 in front and rear plates 42 and 43 respectively, which extend upwardly from the guide plate 35 and which also serve as journals for the cam shaft 44 on which the cam 38 is mounted. The cam shaft 44 at its rear end is provided with a worm gear 45 which meshes with a worm 46 on a worm shaft 47, which is connected by a coupling 48 with a shaft 49 suitably geared to the motor 22.

The upper rack bar 39 is provided on its under side with rack teeth 50 which mesh with a pinion 51 on a shaft section 52, which is secured to an aligned shaft section 53 by an offset coupling connection 54, arranged to permit partial rotation of the shaft sections 52—53, without interference from a vertical selector shaft 55, the function of which shaft will be hereinafter described. The aligned shaft sections 52—53, which operatively considered constitute a single shaft, are journalled at their ends within journal bosses 56 formed on the vertical legs 57 of a rear frame, which also comprises a boss 58 and a top plate 59, giving to the structure the appearance of an open rectangular frame.

Figure 7:
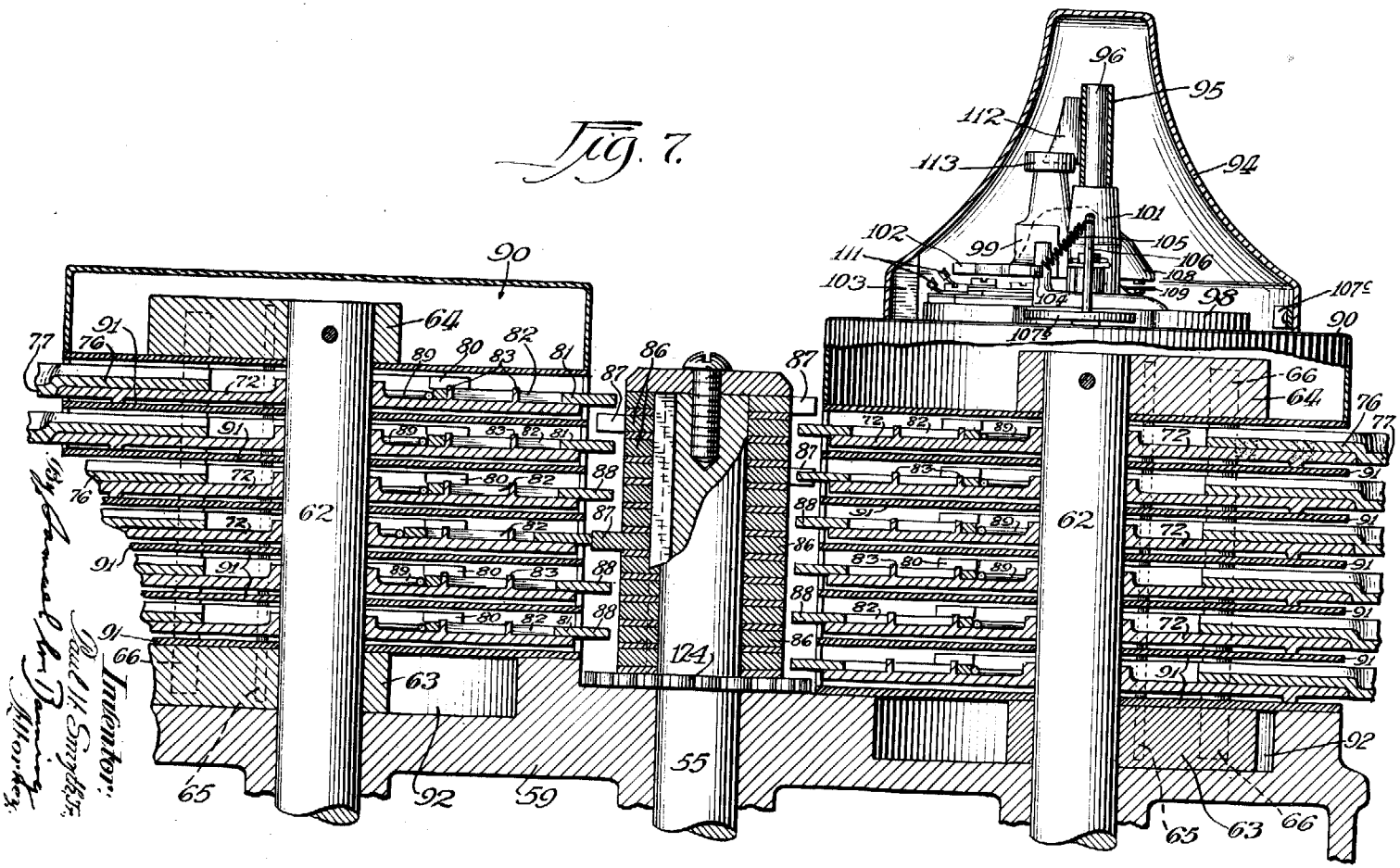
Fig. 7 is a sectional elevation taken on line 7—7 of Fig. 6.
Figure 11:
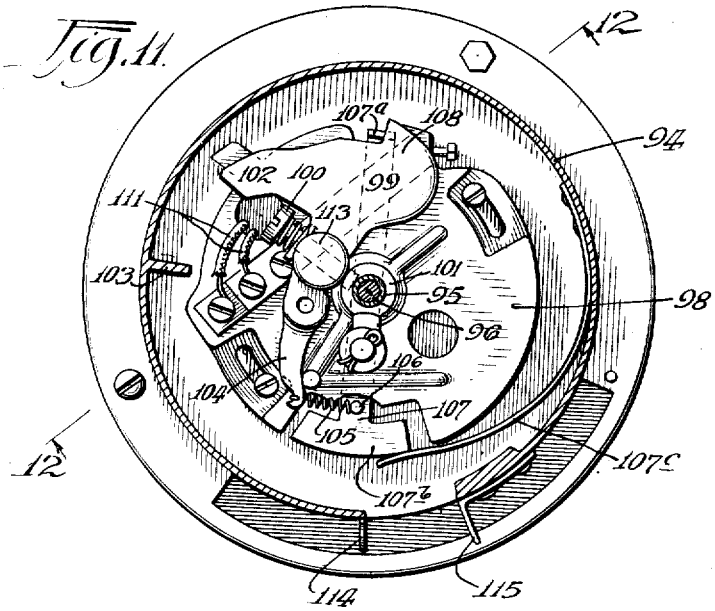
Fig. 11 is a plan view showing the switch mechanism actuated by the tone arm.
Figure 12:
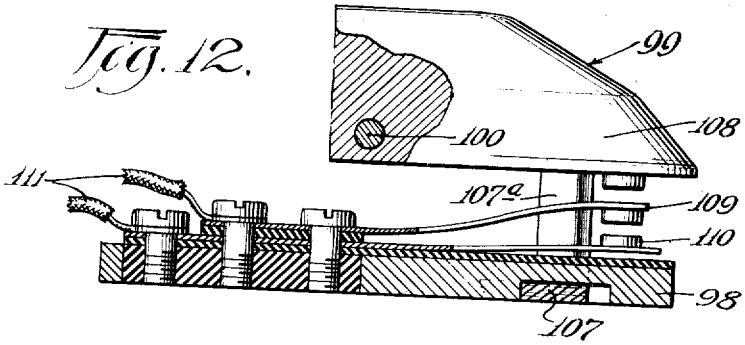
Fig. 12 is a sectional detail taken on line 12—12 of Fig. 11.
Figure 13:
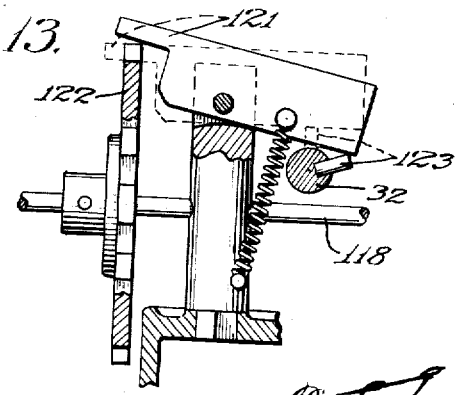
Fig. 13 is a detail of the lock for holding the selector indicating dial against movement during a portion of the cycle of operations.

The shaft sections 52—53 respectively carry bevel gears 60—60 which mesh respectively with bevel gears 61—61 mounted respectively at the lower ends of depending shafts 62—62 which are journalled through the top plate 59 and extend above said plate, as indicated in Fig. 7. The shaft 62 may be termed the record carrier shafts, and since they are mounted in duplicate, a description of one will suffice for both.

Figure 8:
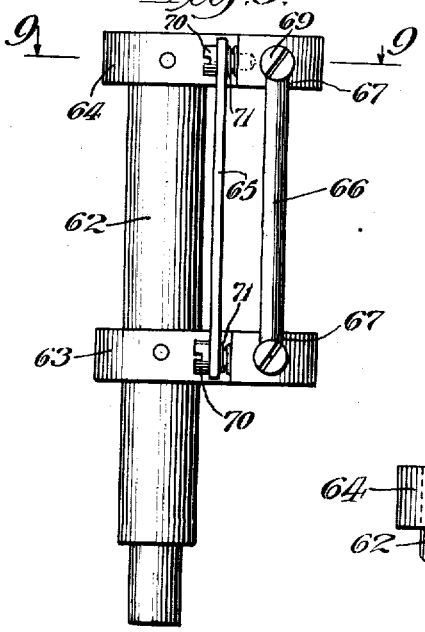
Fig. 8 is a detail in elevation, showing the universal restoring mechanism for the record carriers.
Figure 9:
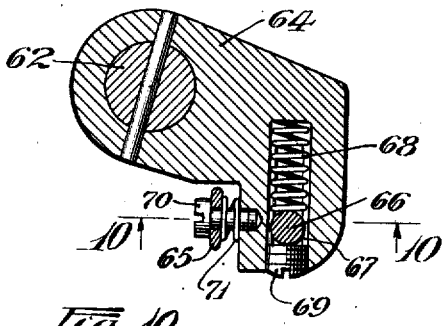
Fig. 9 is a sectional plan view taken on line 9—9 of Fig. 8.
Figure 10:
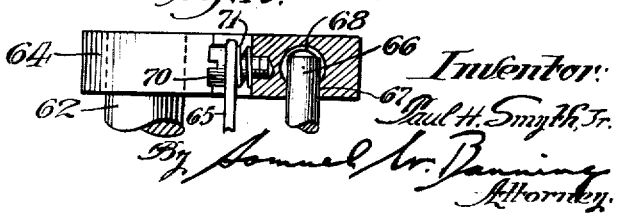
Fig. 10 is a sectional detail taken on line 10—10 of Fig. 9.

Each of the shafts 62 carries a lower restoring arm 63 and an upper restoring arm 64, the two arms standing in aligned relation and being keyed or otherwise rigidly secured to the shaft. Between the upper and lower restoring arms extends a universal restoring bar 65 (Fig. 8) and a universal latch bar 66, which latch bar has its ends entered within grooves 67—67 in the respective arms and is backed at each end by a coil spring 68 which permits the latch bar to yield slightly, and the ends of the latch bar are retained in place by screw plugs 69—69 (Fig. 9). The restoring bar 65 is carried upon screw bolts 70, and bears at each end against a spring 71, adapting the restoring bar to yield as occasion may require.

Figure 6:
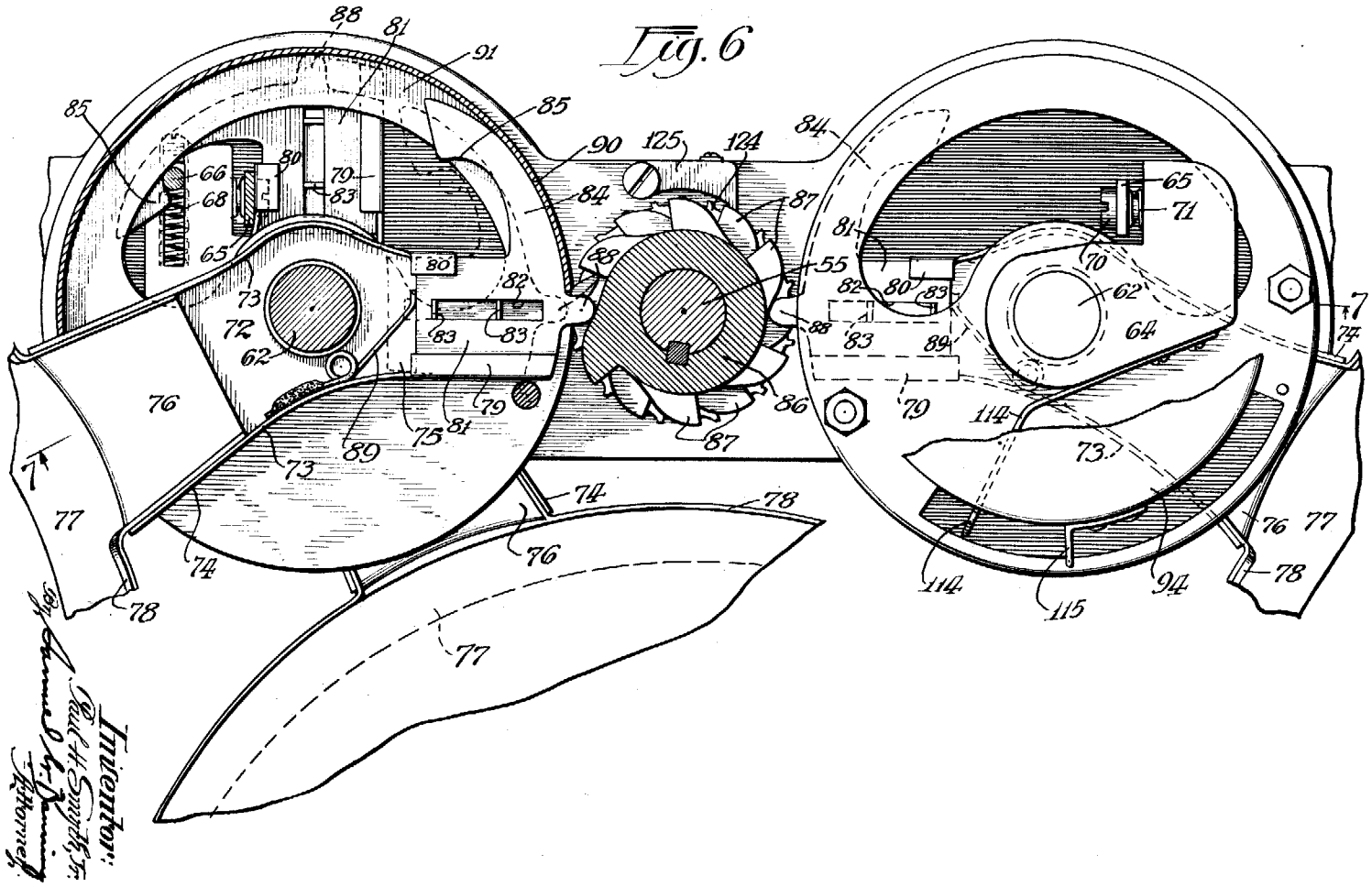
Fig. 6 is enlarged detail, partly in section, of the trip mechanism for controlling the selection of the record carriers.

Each shaft 62 serves as a mounting for a series of heads 72, which are shown formed of stamped metal provided with edge flanges 73. Each carrier head comprises an outer arm 74 and an inner arm 75 standing in opposed relation to one another, and the outer arm serves as a mounting for a neck plate 76 which extends inwardly from a carrier ring 77 provided with a marginal flange 78, the ring being adapted to receive and retain a phonographic record disk, and having an internal open diameter sufficient to permit the turntable to pass upwardly therethrough to engage and lift the record deposited thereon. Fig. 6 shows the upper carrier heads standing in normal or retracted position with one of the underlying carrier heads, with the record supported thereby, swung inwardly to the medial position in alignment with the turntable.

In order to selectively operate the carrier heads, the following mechanism is provided: The inner arm 75 of the carrier head has its margins turned inwardly to afford guide flanges 79 and 80, between which is slidably mounted a latch plate 81 having a slot 82 engaged and guided by upstanding tongues or fingers 83—83 formed on the arm 75, so that a limited radial in and out movement is permitted to the latch plate.

The latch plate 81 is provided with a rearwardly extending arcuate finger 84 configured on its inner edge to afford a hook 85, which when properly adjusted is adapted to be engaged by the universal latch bar 66, which in Fig. 6 on the upper left hand side is illustrated in the position which it assumes when moved to the degree required to swing one of the carriers to the medial or delivering position.

When the latch finger 84 is tripped or moved inwardly to the position indicated in dotted lines in Fig. 6, the hook 85 will stand in a position to be engaged by the universal latch bar, but the present device is so constructed that only one of the entire two-series group of latch fingers may be tripped at a time, so that at each operation of the machine, the universal latch bars on opposite sides of the machine will move idly with respect to all save one of the trip fingers, so that only a single carrier will be moved to the record delivering position, and when thus moved, the universal restoring bar 65 will abut against the flange 80 on the inner arm of the carrier head and in position to restore the record after the conclusion of the playing interval, as indicated in Fig. 6.

In order to trip the desired record, the following mechanism is provided: The selector shaft 55 has keyed thereto a series of disks 86, each provided with a tooth 87, the respective teeth standing in progressive or offset arrangement around the shaft, as indicated in Fig. 6, so that in any given adjustment of the selector shaft but a single tooth will stand in coacting relation to the associated trip finger.

Each of the trip fingers is provided with an outwardly extending lug 88 so disposed that when the associated tooth 87 is adjusted into engaging relation therewith, the trip plate 81 will be moved inwardly to the dotted line position shown in Fig. 6, thereby bringing the hooked trip finger 85 into engaging relation with the universal trip bar, but all of the other trip plates 81 will be held outwardly by the action of springs 89 bearing against the inner ends of the respective plates.

The carrier heads with their trip fingers are housed within a drum shaped casing 90 provided with a plurality of partitions 91 which separate the casing into compartments, within each of which compartments one of the operating mechanisms is located; and the side wall of the housing is cut away throughout 180° to afford the necessary clearance for the operation of the parts.

The lower restoring arm 63 operates within a recess 92 formed in the plate 59, and the two sets of mechanisms are symmetrically arranged on opposite sides of the selector shaft 55, so that the fingers of the latter will serve to select any desired record in either of the stacks.

The right hand casing 90 carries the mounting for the tone arm 93, which mounting is in the form of a rotatable conical cap 94 which is provided with a central sleeve 95 swivelly mounted upon a center post 96 which serves to center the cap 94 and permit it to rotate with the tone arm as the arm swings inwardly, due to the engagement of the needle 97 with the record line.

Secured to the housing 90 is a stationary switch base plate 98 which carries the post 96. The switch base plate 98 serves as a support for a rocking switch member 99 which is loosely tiltably mounted upon a pin 100 anchored in a boss 101 upstanding from and carried by the base plate 98, which mounting is sufficiently loose to afford limited rotative movement of the switch member 99 upon the pin 100, and at the same time a limited rocking movement upon the same pin.

The switch member is provided with an arm 102 adapted to be contacted by a fin 103 standing inwardly from the conical cap. The switch is also provided with a tail 104 which is engaged by a spring 105, the opposite end of which is secured to a post 106 upwardly standing from a central pivoted arm 107, the spring being obliquely disposed to exert a backward and upward pull on the tail 104, which has the effect of oppositely urging the head end 108 of the switch member. The head end of the switch member, when the switch is open, is lifted and rests upon a finger 107a upturned from the pivotally mounted arm 107, and when the switch member is carried around by the engagement of the fin 103 with the finger 102, the head 108 will be tripped off from the finger 107a and drawn downwardly by the tension of the spring 105, and in so doing will close a switch comprising spring contact members 109—110, thereby closing a circuit through circuit wires 111 which serve to energize the motor 22.

The switch head 108 is actuated in the opposite direction to open the switch by the contact of a fin 112 connecting the inner wall of the cap 94 with the sleeve 95, which fin when the tone arm is restored to normal position is brought into engaging relation with the upper end of a stud 113 upstanding from the rocking axis of the switch member, so that the restoring movement of the arm will serve to open the switch at the proper instant.

Figure 5:
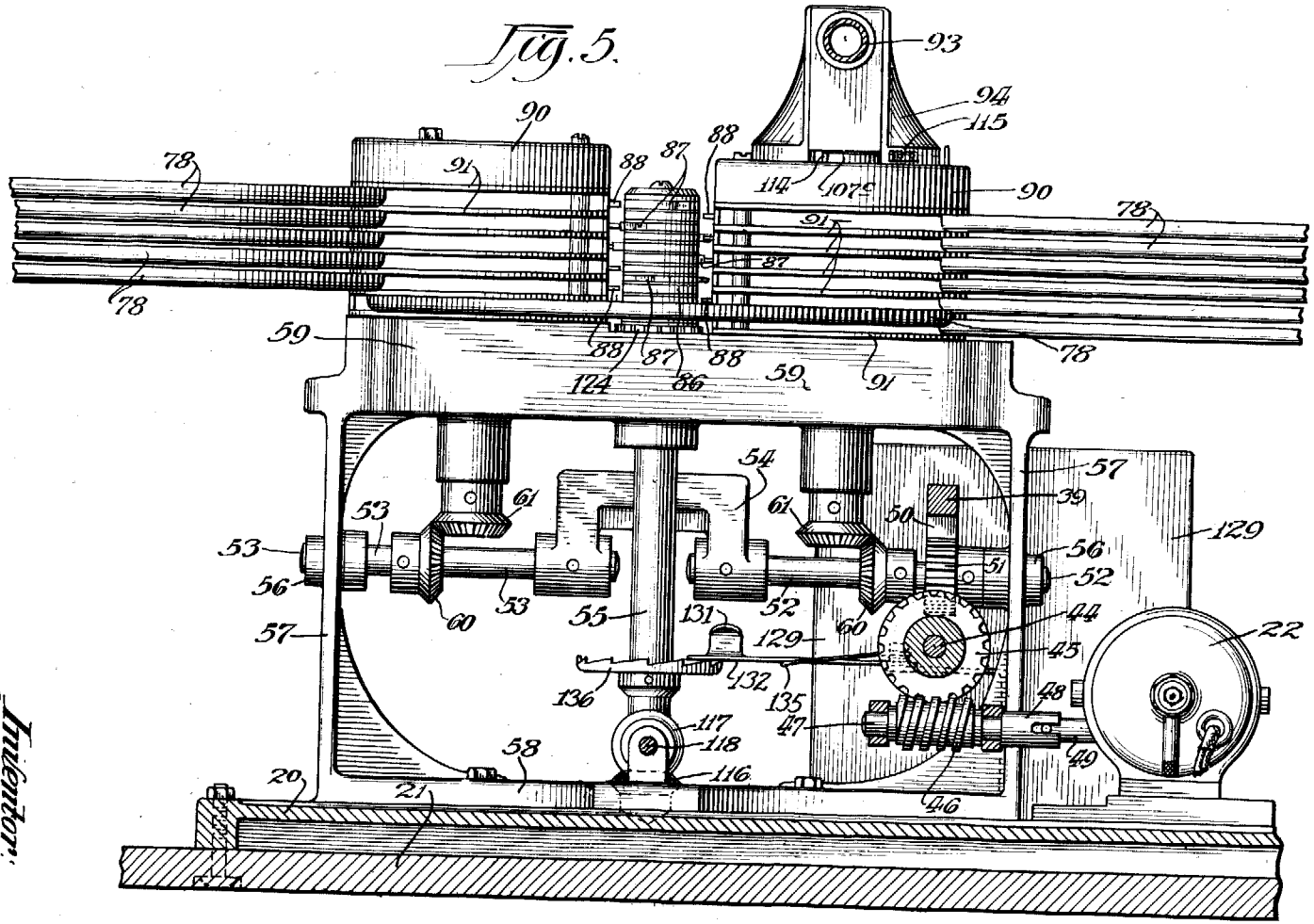
Fig. 5 is a longitudinal sectional elevation taken on line 5—5 of Fig. 4, looking toward the arrow.

In order to effect a restoration of the tone arm, the upper restoring arm 64 of the right hand side of the machine (Figs. 5 and 6) is provided with a finger 114, which stands outwardly in position to engage a finger 115 on the wall of the conical casing 94, so that as the restoring arm 64 is moved, the fingers 114 and 115 will come into engagement and the tone arm will be swung backwardly, with the result that at the terminus of this movement the fin 112 will engage the stud 113.

The forward end of the arm 107 is extended to form a T-shaped head 107b adapted to be engaged by the free end of a flat spring 107c inwardly extending from the cap 94. The relation of these parts is such that the switch will be opened at the terminus of the restoring movement of the tone arm, which rocks back the stud 113 and at the same time the wiping movement of the spring 107c along the head 107b throws the finger 107a slightly to the left in Fig. 7. This has the effect of so positioning the finger 107a that the head 108 of the switch, if released, will clear the finger and close the switch. As the record begins to play, however, the clockwise movement of the tone arm, through contact of the spring 107c with the head 107b, restores the finger 107a to position beneath the head 108, so that upon the release of the stud 113 by the fin 112, a closing movement of the switch will be impeded by the finger 107a.

However, upon the terminus of the playing movement, the fin 103 will engage the finger 102 and kick the head 108 off from the finger 107a, thereby closing the switch at the termination of the playing period, and thus energizing the motor 22 to initiate the movements required in restoring the mechanism to its initial position.

As incidental to these restoring movements, the tone arm will be swung outwardly, and at the terminus of its movement will lift and open the switch, and at the same time move the finger 107a sufficiently to retard the subsequent closing of the switch until kicked off from the finger by the fin 103.

The selection of the desired record is effected by rotating the selector shaft 55 through the medium of intermeshing bevel gears 116—117 (Fig. 4), the latter of which is mounted upon an adjusting rod 118 carrying a knurled knob 119 and a dial 120 having figures inscribed thereon corresponding to the numbers of the respective records.

A lock is provided to prevent adjustment while the turntable is in its lowermost position, which lock is in the form of a pivoted finger 121 adapted to engage with any one of the notches in the disk 122 on the rod 118. The shaft 32 carries a finger 123 which is adapted to engage and to lift the tail end of the finger 121 during the cycle of operations of the machine, and to be turned into engaged relation after the turntable has been lowered thereby preventing adjustment of the selector indicating dial 120 only while the turntable is in the lowermost position.

In order to prevent turning of the selector shaft 55 in a reverse direction, a ratchet 124 is provided, which is engaged by a spring bar 125 (Figs. 1 and 5) which permits rotation in one direction only.

The turntable motor 23 is actuated through a switch 126 suitably controlled by a cam 127 on the shaft 32. It is not deemed necessary to describe that switch in detail, it sufficing to point out that as the turntable is elevated to playing position, the switch is operated to energize the motor and thereby to start the turntable, and when the switch is thus operated to start the turntable, it interrupts the circuit of the motor 22 to permit the turntable to remain in playing position until the contacts 109 and 110 are operated by the tone arm.

Figure 2:
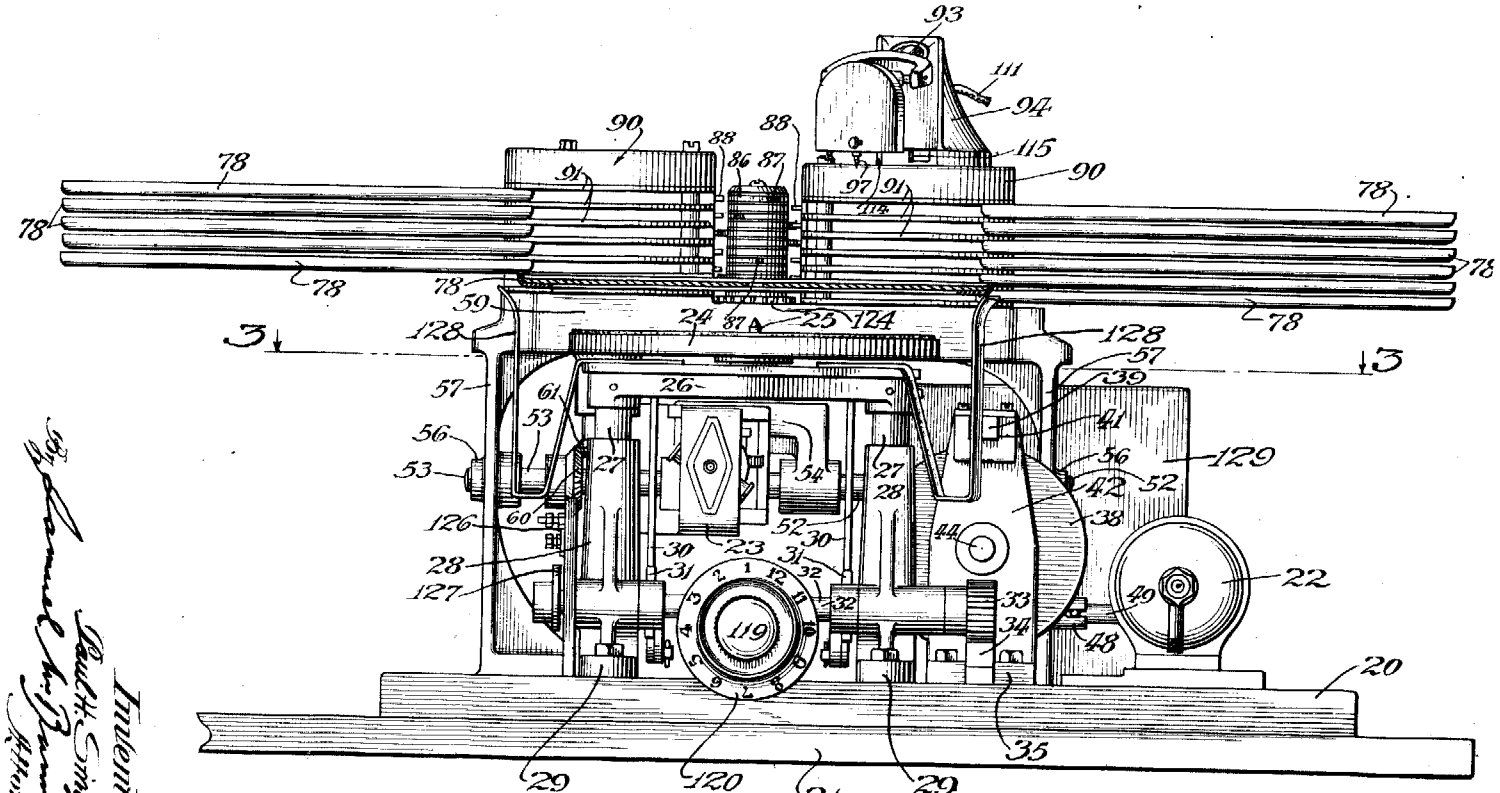
Fig. 2 is a front elevation of the machine.
Figure 3:
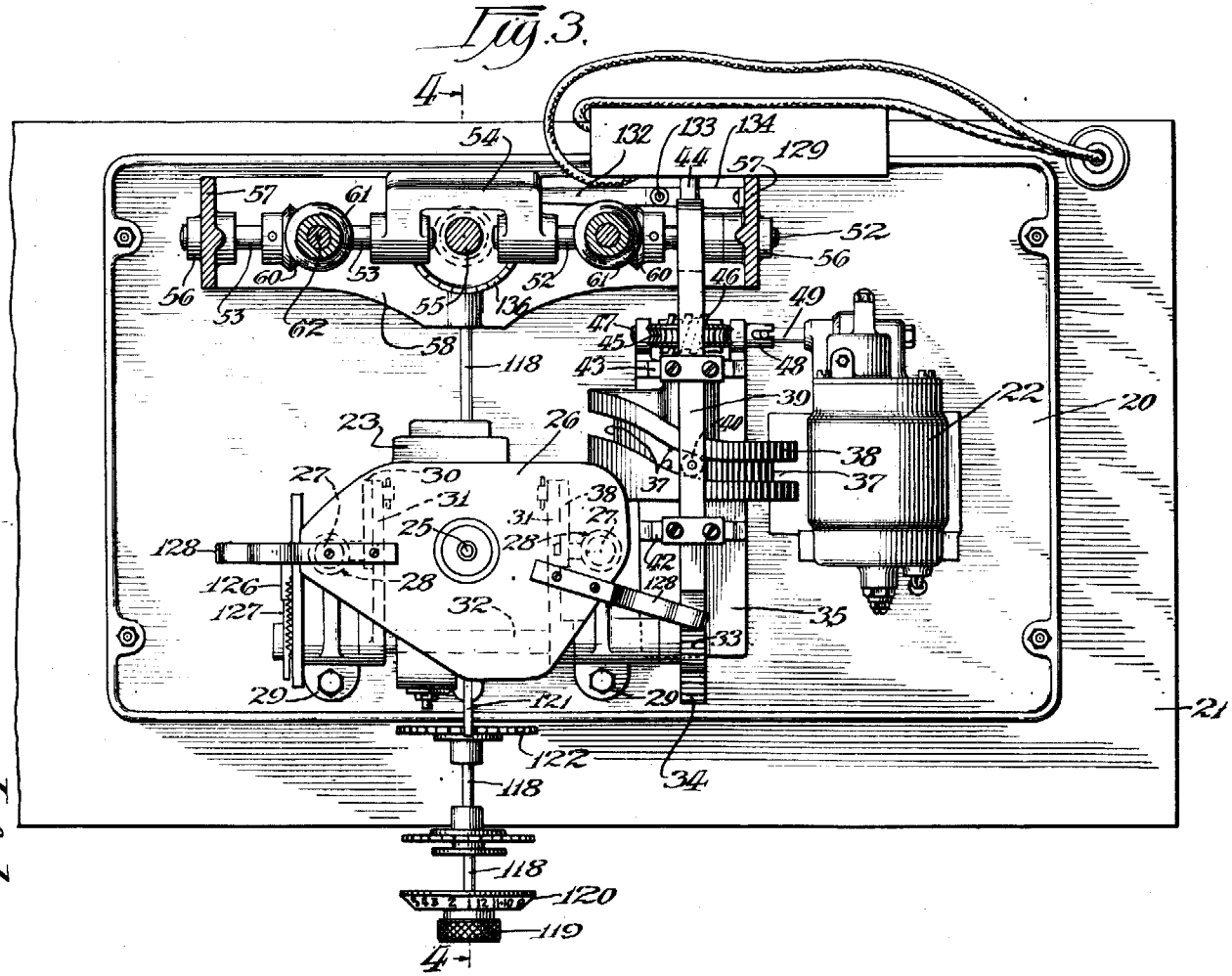
Fig. 3 is a plan cross-section taken substantially along the lines 3—3 of Fig. 2.

In order to more definitely guide and center the records in exact position, so that the hole in the center of each record will be engaged by the turntable post 25, a pair of guide arms 128 are provided which stand outwardly from the platform 26 to a sufficient distance to embrace the selected carrier ring, as indicated in Figs. 1 and 2.

The operation of the machine is controlled by coin actuated mechanism housed in a coin box 129 into which the rear end of the shaft 44 projects, which shaft, through any suitable mechanism properly correlated with the time control mechanism, serves to actuate the coin controlled switch in the coin box after the completion of the cycle of operations.

The present invention is not concerned with the details of the coin controlled mechanism, it sufficing to point out that such mechanism is properly correlated with the action of the present machine through the intervention of the shaft 44.

The yoke member 54 connecting the adjacent ends of shaft sections 52 and 53 is, as already mentioned, adapted to rock with the shaft sections when they are driven by the rack 39 and the enmeshing gear or pinion 51 from the cam 38. In so rocking, the yoke member 54 may engage an ear 131 on a pawl 132 pivoted as at 133 on an arm 134 secured on one of the legs 57, and may thus swing the pawl 132 inwardly toward the shaft 55. A spring 135 is adapted to urge the pawl 132 toward its initial position.

The pawl 132 may be employed to rotate the shaft 55 by engaging a ratchet 136 fixed thereon, whereby when the yoke member 54 engages the ear 131 of the pawl 132, the shaft 55 will be rotated sufficiently to bring a succeeding tooth 87 in coacting relationship with the associated trip finger lug 88, in order to select the record carrier corresponding to the lug 88.

In that manner all or some (depending upon the number of coins inserted in the coil control mechanism) of the record carriers may be automatically selected in a predetermined sequence and the records therein may be played in the same sequence. As illustrated, the pawl 132 and ratch 136 are so arranged that for each reciprocation of the yoke member 54, the shaft 55 rotates through the angle between two teeth 87 controlling successive record carriers. In other words, as illustrated, all or some (depending upon the number of coins inserted in the coin control mechanism, of the record carriers may be automatically selected, one after another in rotation, and the records carried by the selected carriers may be played in rotation.

With such an automatic arrangement, when the dial 120 is rotated manually to a position indicating the selection of a given record, the shaft 55 is rotated sufficiently to bring the finger 87 corresponding to the next preceding record carrier, to its operative engagement with the trip finger lug 88 of that record carrier. Then, during the operation of restoring the previously played record, the yoke member 54 actuates the pawl 132 and ratchet 136 to rotate the shaft 55 and to bring the finger 87 into coacting relationship with the trip finger lug 88 of the record carrier bearing the selected record corresponding to the figure indicated on the dial 120.

*Operation*

With the turntable in a lowered position slightly below its playing position, and with the tone arm swung outwardly, one or more coins are deposited in the coin runway (not shown), which closes the above mentioned switch (not shown) in the coin actuated mechanism 129 for energizing the motor 22, which through the worm gearing causes the rotation of the shaft 44 carrying the cam 38.

The rotation of the cam serves to actuate the lower rack 36 and the upper rack 39, and the cam groove 37 is so disposed that the first operation to be effected will be a lowering of the turntable from a position slightly below the playing position through the previously selected record carrier to return the previously played record to its record carrier and the restoration of that record carrier with the played record therein to its position within its stack. A new record is swung inwardly prior to the lifting of the turntable to its elevated position. These operations are effected through the rearward movement of the rack 39 which rotates the aligned shaft sections 52—53 in a proper direction to carry the coupling 54 downwardly behind the selector shaft 55, and in so doing to index the shaft 55 the distance between succeeding fingers 87 through the pawl 132 and the ratchet 136, and to impart rotation through the beveled pinions 60—61 to the respective shafts 62 carrying the restoring mechanism.

Referring to Fig. 6, the restoration of the previously advanced record carrier to the left hand stack is effected by the universal restoring bar 65 which engages the short arm of the carrier head and swings it clockwise until the trip finger 84 is restored to its normal or negative position with the lug 88 projecting from the slot in the wall of the housing. This completes the restoration of the record carrier and permits the universal latch bar 68 to cam under the end of the record selected for playing.

The selection of the record is effected by adjustment of the selector shaft 55 to bring the proper finger 87 into engagement with the associated lug 88 whereby to press the corresponding finger 84 inwardly for engagement with the universal latch bar 66. That selector shaft 55 may, as already described, be so adjusted, at least initially, by the beveled gears 116 and 117, the shaft 118, and the selector knob 119, and subsequently during each restoration of a played record by the shaft coupling 54, the pawl 132, and the ratchet 136. After each such selection is effected, the configuration of the cam slot 37 causes an advancing movement of the rack bar 39, which imparts a reverse movement to the aligned shaft sections 52—53, and during this period of operation, the universal latch bar 66 swinging in a counter-clockwise direction will carry with it the engaged latch finger 84 of the record carrier bearing the record selected for play and will thus swing the carrier ring to the center and in position to permit the record to be lifted by the elevation of the turntable.

The movements just described will be imparted to the restoring and latching mechanisms in both of the stacks, it being understood, however, that one or the other of the universal latching and restoring mechanisms may operate idly throughout the entire cycle in the event that both restoration and selection of a new record occur in the same stack, or that the restoring movement may occur in one stack, and the selected movement in the other stack, depending in all cases upon the location of the selected record.

After the newly selected record has been swung to the central position, the configuration of the cam groove 37 is such that the lower rack bar will begin to move inwardly (Fig. 4), rotating the shaft 32 in a clockwise direction, and thereby elevating the turntable through the action of the arms 31 and links 30. As the turntable is elevated, the arms 128 will embrace the centrally positioned carrier ring and serve to hold it accurately in position while the turntable is rising, so that the turntable post 25 will engage the center hole in the record, and thereafter the continued elevation of the turntable will lift the record free from the carrier ring and continue to rise until the record is elevated to playing position, as indicated by dotted lines in Fig. 4.

The range of movement of the turntable is sufficient to clear the space occupied by any selected record, irrespective of the plane of the selected carrier ring, so that the turntable will always engage a selected record irrespective of its vertical position. During the raising of the turntable, the switch 126 will be operated. In that manner the turntable motor will be energized so that by the time the record arrives at the playing position it will be rotating rapidly and will thus engage the needle 97 to start the playing of the record, and the motor 22 will be deenergized to cause the turntable to remain in playing position during the playing of the record. As the tone arm is swung inwardly during the playing period, the fin 112 of the cap 94 will move away from the stud 113, allowing the switch head 108 to rest upon the finger 107a with the switch open, so that during the playing interval the motor 22 will remain de-energized and until the swinging of the tone arm has brought the fin 103 into engagement with the finger 102 of the switch, after which the continued movement of the tone arm will trip the switch head off the finger and close the motor circuit and again energize the motor 22.

The energizing of the motor 22 will again operate the cam 38, and the first action to be effected will be a lowering of the turntable away from the tone arm, which concludes the cycle of operations initiated by the deposit of a coin and serves to de-energize the motor 22 and also to open the switch which controls the operation of the turntable motor. When another coin is deposited, the turntable redeposits the previously played record within its carrier ring, after which the turntable will continue to descend below the plane of movement of the carrier rings and to its lowermost position.

It will thus be understood that a single rotation of the cam 38 initiates a cycle of operations which includes the restoration of the previously played record, the swinging out of the newly selected record, the elevation of the turntable, and the carrying of the new record to the playing position, the playing of the record, and the lowering of the turntable and redeposit of the played record within its carrier ring.

It will be understood, moreover, that the arrangement of the lock 121 is such that the selected mechanism can only be set during the period that the turntable is removed from its lowermost position.

The arrangement of the machine as a whole is one which enables the total number of record carriers to be arranged in two symmetrically disposed groups and which permits the operating mechanisms to be similarly divided and grouped, so that the range of movement required of the turntable is correspondingly reduced, and at the same time the machine as a whole presents a symmetrical appearance and a balanced or symmetrical structure, which simplifies construction and facilitates distribution of power.

By swinging the selected records inwardly, each within its own vertical plane, it becomes unnecessary to lift an entire stack of records in order to present a selected record to the playing position, and by disengaging the records from their respective carriers by lifting and restoring the records by the vertical movements of the turntable, the possibility of mal-adjustment of the records is entirely obviated.

Although the invention has been described with particularity, it is not the intention, unless otherwise indicated in the claims, to limit the invention in the precise form of mechanism shown, since numerous modifications therein can be made without departing from the spirit of the invention.

I claim:

1. In phonographic mechanism of the class described, the combination of a plurality of ring shaped record carriers, a vertical shaft upon which the record carriers are pivotally mounted, means for oscillating said shaft, means for selectively engaging any one of the record carriers with the shaft to cause swinging thereof with the forward oscillation of the shaft, restoring means carried by the shaft for afterwards restoring the selected record carrier to normal position, a rotatable turntable, and means for raising and lowering the turntable through the position occupied by the selected record carrier when swung outwardly to lift and afterwards restore the selected record, and means for playing the record when lifted.

2. In phonographic mechanism of the class described, the combination of a plurality of ring shaped record carriers, a vertical shaft upon which the record carriers are pivotally mounted, means for oscillating said shaft, means for selectively engaging any one of the record carriers with the shaft to cause swinging thereof with the forward oscillation of the shaft, restoring means carried by the shaft for afterwards restoring the selected record carrier to normal position, the restoring means being universal to all of the record carriers, a rotatable turntable, and means for raising and lowering the turntable through the position occupied by the selected record carrier when swung outwardly to lift and afterwards restore the selected record, and means for playing the record when lifted.

3. In phonographic mechanism of the class described, the combination of a plurality of ring shaped record carriers, a vertical shaft upon which the record carriers are pivotally mounted, means for oscillating said shaft, means for selectively engaging any one of the record carriers with the shaft to cause swinging thereof with the forward oscillation of the shaft, restoring means carried by the shaft for afterwards restoring the selected record carrier to normal position, a rotatable turntable, and means for raising and lowering the turntable through the position occupied by the selected record carrier when swung outwardly to lift and afterwards restore the selected record, and means for playing the record when lifted, and automatic mechanism for timing the operations of the record carriers and turntable to cause the outward swinging of the selected record, the subsequent lifting and lowering of the turntable, and ultimate restoring of the selected record carrier to normal position.

4. In phonographic mechanism of the class described, the combination of a plurality of ring shaped record carriers, a vertical shaft upon which the record carriers are pivotally mounted, means for oscillating said shaft, means for selectively engaging any one of the record carriers with the shaft to cause swinging thereof with the forward oscillation of the shaft, restoring means carried by the shaft for afterwards restoring the selected record carrier to normal position, the restoring means being universal to all of the record carriers, a rotatable turntable, and means for raising and lowering the turntable through the position occupied by the selected record carrier when swung outwardly to lift and afterwards restore the selected record, and means for playing the record when lifted, and automatic mechanism for timing the operations of the record carriers and turntable to cause the outward swinging of the selected record, the subsequent lifting and lowering of the turntable, and the ultimate restoring of the selected record carrier to normal position.

5. In phonographic mechanism of the class described, the combination of a plurality of ring shaped record carriers each mounted upon an arm, a vertical shaft upon which the record carrier arms are pivotally mounted, means for selectively engaging any one of the record arms with the shaft, and means for oscillating the shaft, universal restoring means carried by the shaft and adapted to carry back any selected record carrier which has previously been swung outwardly, a rotatable turntable, and means for raising and lowering the turntable to move through the position occupied by an outwardly swung record carrier for engaging and restoring the record carried thereby, and means for playing the selected record when elevated, a motor carried by the turntable for rotating the same, a motor for actuating the outward swinging and restoration of the record carriers, and automatic means for timing the movements of the respective mechanisms.

6. In phonographic mechanism of the class described, the combination of two longitudinally superposed sets of record carriers, each set normally standing in column relation and each of the record carriers of each set being pivotally mounted on a common vertical pivot, and adapted to swing inwardly within its own plane to delivering position, means for swinging a selected record carrier to delivering position, and a vertically movable rotatable turntable adapted to move through the delivering planes of all the record carriers, and adapted thereby to engage and remove the selected record from the positioned record carrier, and means for playing the selected record when elevated by the turntable, and a single selector shaft located intermediate the sets of record carriers, said selector shaft being provided with means special to each of the record carriers for effecting engagement of the selected record carrier with said means for swinging it outwardly.

7. In phonographic mechanism of the class described, the combination of two longitudinally superposed sets of record carriers, each set normally standing in column relation and each of the record carriers of each set being pivotally mounted on a common vertical pivot, and adapted to swing inwardly within its own plane to delivering position, means for swinging a selected record carrier to delivering position, and a vertically movable rotatable turntable adapted to move through the delivering planes of all the record carriers, and adapted thereby to engage and remove the selected record from the positioned record carrier, and means for playing the selected record when elevated by the turntable, and a universal restoring mechanism for each set of record carriers, adapted to restore a previously positioned record to normal position, and a single selector shaft located intermediate the sets of record carriers, said selected shaft being provided with means special to each of the record carriers for effecting engagement of the selected record carrier with said means for swinging it outwardly.

8. In phonographic mechanism of the class described, the combination of two longitudinally superposed sets of record carriers, each set normally standing in column relation and each of the record carriers of each set being pivotally mounted on a common vertical pivot, and adapted to swing inwardly within its own plane to delivering position, means for swinging a selected record carrier to delivering position, and a vertically movable rotatable turntable adapted to move through the delivering planes of all the record carriers, and adapted thereby to engage and remove the selected record from the positioned record carrier, and means for playing the selected record when elevated by the turntable, and adjustable selector mechanism provided with devices special to each of the record carriers, said selector devices being adapted when brought into coacting relation with the associated record carrier to effect engagement thereof with the means for swinging said record carrier outwardly.

9. In phonographic mechanism of the class described, the combination of two longitudinally superposed sets of record carriers, each set normally standing in column relation and each of the record carriers of each set being pivotally mounted on a common vertical pivot, and adapted to swing inwardly within its own plane to delivering position, means for swinging a selected record carrier to delivering position, and a vertically movable rotatable turntable adapted to move through the delivering planes of all the record carriers, and adapted thereby to engage and remove the selected record from the positioned record carrier, and means for playing the selected record when elevated by the turntable, and a universal restoring mechanism for each set of record carriers, adapted to restore a previously positioned record to normal position, and a single selector shaft located intermediate the sets of record carriers, and provided with selector devices special to each of the record carriers, said selector devices being adapted when brought into coacting relation with the associated record carrier to effect engagement thereof with the means for swinging said record carrier outwardly.

10. In phonographic mechanism of the class described, the combination of a vertically movable rotatable turntable and means for vertically moving and rotating the same, a set of carrier rings adapted to normally stand in column relation and each ring provided with an extension, a pivotal mounting for said extensions, a slidable latch member carried by each of the extensions, a universal latching device adapted to engage with any one of the latch members when moved to latch engaging position, means for swinging the universal latching device to carry with it any one of the carrier extensions latched thereto, and adjustable selector means adapted to selectively engage the respective latching members on the several carrier extensions to move a selected latch member to position to be engaged by the universal swinging latching device, the turntable being positioned to move vertically through the positions occupied by the respective carrier rings when swung inwardly, and means for playing the selected record.

11. In phonographic mechanism of the class described, the combination of a set of ring shaped record carriers normally standing in column relation, each provided with an extension, vertically extending pivoting means for the several extensions, a universal latch bar associated with the set of carriers and mounted to swing inwardly, a latching finger on each of the carrier extensions adapted when tripped to be engaged by the universal latch bar, selector means for tripping the latching finger of the selected carrier to position to be engaged by the universal latch bar, and means for swinging the universal latch bar to carry with it the engaged record carrier, a turntable and means for rotating the same, and means for raising and lowering the turntable through the planes occupied by the respective carrier rings when swung inwardly to engage and elevate a selected record and subsequently restore the same to its carrier ring, and means for playing the selected record when elevated.

12. In phonographic mechanism of the class described, the combination of a set of ring shaped record carriers normally standing in column relation, each provided with an extension, vertically extending pivoting means for the several extensions, a universal latch bar associated with the set of carriers and mounted to swing inwardly, a latching finger on each of the carrier extensions adapted when tripped to be engaged by the universal latch bar, selector means for tripping the latching finger of the selected carrier to position to be engaged by the universal latch bar, and means for swinging the universal latch bar to carry with it the engaged record carrier, a restoring bar associated with the universal latch bar and mounted to swing therewith and adapted to engage a previously swung record and restore it to column position, a turntable and means for rotating the same, and means for raising and lowering the turntable through the planes occupied by the respective carrier rings when swung inwardly to engage and elevate a selected record and subsequently restore the same to its carrier ring, and means for playing the selected record when elevated.

13. In phonographic mechanism of the class described, the combination of a plurality of carrier rings, each provided with an extension, vertical pivot means for the extensions, a pivoted universal latch bar common to all of the extensions, a latching finger carried by each of the extensions and adapted to be tripped in position to be engaged by the universal latch bar, and a rotatable selector shaft provided with a series of fingers adapted severally to engage with the respective latching fingers and to trip the fingers to position to be engaged by the universal latch bar, and means for swinging the latch bar to swing an engaged carrier outwardly to delivering position, a vertically movable turntable, and means for raising and lowering the same to traverse the planes occupied by the respective records when swung to delivering position, and to thereby engage and elevate the selected record, and means for playing the selected record when elevated.

14. In phonographic mechanism of the class described, the combination of a plurality of ring shaped record carriers, a vertical shaft upon which the record carriers are pivotally mounted, means for oscillating said shaft, means for selectively engaging any one of the record carriers with the shaft to cause swinging thereof with the forward oscillation of the shaft, restoring means for afterwards restoring the selected record carrier to normal position, a rotatable turntable, and means for raising and lowering the turntable through the position occupied by the selected record carrier when swung outwardly to lift and afterwards restore the selected record, and means for playing the record when lifted.

15. In phonographic mechanism of the class described, the combination of a plurality of ring shaped record carriers, a vertical shaft upon which the record carriers are pivotally mounted, means for oscillating said shaft, means for selectively engaging any one of the record carriers with the shaft to cause swinging thereof with the forward oscillation of the shaft, restoring means for afterwards restoring the selected record carrier to normal position, the restoring means being universal to all of the record carriers, a rotatable turntable, and means for raising and lowering the turntable through the position occupied by the selected record carrier when swung outwardly to lift and afterwards restore the selected record, and means for playing the record when lifted.

16. In phonographic mechanism of the class described, the combination of a plurality of ring shaped record carriers, a vertical shaft upon which the record carriers are pivotally mounted, means for oscillating said shaft, means for selectively engaging any one of the record carriers with the shaft to cause swinging thereof with the forward oscillation of the shaft, restoring means for afterwards restoring the selected record carrier to normal position, a rotatable turntable, and means for raising and lowering the turntable through the position occupied by the selected record carrier when swung outwardly to lift and afterwards restore the selected record, and means for playing the record when lifted, and automatic mechanism for timing the operations of the record carriers and turntable to cause the outward swinging of the selected record, the subsequent lifting and lowering of the turntable, and the ultimate restoring of the selected record carrier to normal position.

17. In phonographic mechanism of the class described, the combination of a plurality of ring shaped record carriers, a vertical shaft upon which the record carriers are pivotally mounted, means for oscillating said shaft, means for selectively engaging any one of the record carriers with the shaft to cause swinging thereof with the forward oscillation of the shaft, restoring means for afterwards restoring the selected record carrier to normal position, the restoring means being universal to all of the record carriers, a rotatable turntable, and means for raising and lowering the turntable through the position occupied by the selected record carrier when swung outwardly to lift and afterwards restore the selected record, and means for playing the record when lifted, and automatic mechanism for timing the operations of the record carriers and turntable to cause the outward swinging of the selected record, the subsequent lifting and lowering of the turntable, and the ultimate restoring of the selected record carrier to normal position.

18. In phonographic mechanism of the class described, the combination of a set of record carriers normally standing in column relation and each of the record carriers of the set being pivotally mounted on a common vertical pivot and adapted to swing inwardly within its own plane to delivering position, means for swinging a selected record carrier to delivering position, a vertically movable rotatable turntable adapted to move through the delivering planes of all of the record carriers and adapted thereby to engage and remove the selected record from the positioned record carrier, means for playing the selected record when elevated by the turntable, and a selector shaft adjacent the set of record carriers, said selector shaft being provided with means special to each of the record carriers for effecting engagement of the selected record carrier with said means for swinging it outwardly.

19. In phonographic mechanism of the class described, the combination of a set of record carriers normally standing in column relation and each of the record carriers of the set being pivotally mounted on a common vertical pivot and adapted to swing inwardly within its own plane to delivering position, means for swinging a selected record carrier to delivering position, a vertically movable rotatable turntable adapted to move through the delivering planes of all of the record carriers and adapted thereby to engage and remove the selected record from the positioned record carrier, means for playing the selected record when elevated by the turntable, and a rotatable selector located adjacent the set of record carriers and adapted in each of its different positions of rotative adjustment to coact with a selected one of the record carriers to effect engagement of the selected record carrier with said means for swinging it outwardly.

20. In phonographic mechanism of the class described, the combination of a set of record carriers each of curved formation and open on its interior to afford edge support for the margin of a record, the carriers normally standing in column relation and each of the record carriers of the set being pivotally mounted on a vertical axis and adapted to swing inwardly to delivering position, the delivering positions of the set of record carriers being in planes superposed in column relation, a vertically movable rotatable turntable mounted to move through the delivering planes of all of the record carriers and adapted thereby to engage and remove the selected record from the positioned record carrier, means for supporting and elevating the turntable normally positioned below the delivering planes of the carriers and adapted to project the turntable upwardly throughout a range of movement commensurate with the delivering planes of all of the record carriers, said supporting and elevating mechanism including linkage and being configured to move through a positioned carrier without contact therewith, said linkage being adapted at the conclusion of its upward thrust to bring the turntable to a gradual stop, a needle coacting with the turntable, and selector mechanism coacting with the swinging mechanism and adapted to be adjusted to effect the swinging of a selected record carrier to delivering position.

21. In phonographic mechanism of the class described, the combination of a set of record carriers each of closed ring shaped formation normally standing in column relation and each of the record carriers of the set being pivotally mounted on a vertical axis and adapted to swing inwardly to delivering position, the delivering positions of the set of record carriers being in planes superposed in column relation, a vertically movable rotatable turntable mounted to move through the delivering planes of all of the closed ring shaped record carriers and adapted thereby to engage and remove the selected record from the positioned closed ring shaped record carrier, means for supporting and elevating the turntable normally positioned below the delivering planes of the closed ring shaped carriers and adapted to project the turntable upwardly throughout a range of movement commensurate with the delivering planes of all of the record carriers, said supporting and elevating mechanism including extensible link elements and being configured to move through a positioned carrier without contact therewith, said link elements being adjustable from a folded to an upwardly extended relation and operable to reduce the lifting speed toward the conclusion of the upward thrust, a needle coacting with the turntable, and selector mechanism coacting with the swinging mechanism and adapted to be adjusted to effect the swinging of a selected record carrier to delivering position.

22. In phonographic mechanism of the class described, the combination of a set of record carriers normally standing in column relation and each of the record carriers of the set being in the form of a closed frame open at its center and configured to engage and support the rim of a record and each of the record carriers of the set being pivotally mounted and adapted to swing inwardly within its own plane to delivering position, means for swinging a selected record carrier to delivering position, a vertically movable rotatable turntable mounted to move through the delivering planes of all of the record carriers and adapted thereby to engage and remove a selected record from the positioned record carrier, means for supporting and elevating the turntable normally positioned below the delivering planes of the carriers and adapted to project the turntable upwardly throughout a range of movement commensurate with the delivering planes of all of the record carriers, said supporting and elevating mechanism including extensible link elements and being configured to move through the open center portion of a positioned carrier without contact therewith, said link elements being adjustable from a folded to an upwardly extended relation and operable to reduce the lifting speed toward the conclusion of the upward thrust, a needle coacting with the turntable, and an adjustable selector located adjacent the set of record carriers and adapted in each of its different positions of selective adjustment to effect engagement between the corresponding record carrier and said means for swinging it to delivering position.

23. In phonographic mechanism of the class described, the combination of a set of record carriers normally standing in column relation and each of the record carriers of the set being in the form of a closed frame open at its center and configured to engage and support the rim of a record and each of the record carriers of the set being pivotally mounted and adapted to swing inwardly within its own plane to delivering position, means for swinging a selected record carrier to delivering position, a vertically movable rotatable turntable mounted to move through the delivering planes of all of the record carriers and adapted thereby to engage and remove a selected record from the positioned record carrier, means for supporting and elevating the turntable normally positioned below the delivering planes of the carriers and adapted to project the turntable upwardly throughout a range of movement commensurate with the delivering planes of all of the record carriers, said supporting and elevating mechanism including extensible link elements and being configured to move through the open center portion of a positioned carrier without contact therewith, said link elements being adjustable from a folded to an upwardly extended relation and operable to reduce the lifting speed toward the conclusion of the upward thrust, a needle coacting with the turntable, and selecting means adapted to effect engagement between a selected record carrier and said means for swinging it to delivering position.

24. In phonographic mechanism of the class described, the combination of a set of open record carriers each configured to afford edge support for a record, each carrier having an extension from one edge thereof for normally supporting the carriers in column relation, a vertical pivot post common to all the extensions for pivoting all of the carriers in coaxial alignment, a universal latch bar having upper and lower arms pivoted at their inner ends substantially concentrically with the pivot post to afford swinging movements of the latch bar around the vertical axis of said pivot post, selector means including a manually controlled mechanical mechanism adjustable to effect engagement between any selected carrier extension and the universal latch bar, cam driven means for swinging the latch bar to swing the selected carrier outwardly to delivering position, a turntable and supporting and elevating means therefor adapted to raise and lower the turntable throughout the delivering planes of all of the record carriers, and needle carrying means cooperating with the the turntable.

25. In phonographic mechanism of the class described, the combination of a set of open record carriers each configured to afford edge support for a record, each carrier having an extension from one edge thereof for normally supporting the carriers in column relation, a vertical pivot post common to all the extensions for pivoting all of the carriers in coaxial alignment, a universal latch bar having upper and lower arms pivoted at their inner ends substantially concentrically with the pivot post to afford swinging movements of the latch bar around the vertical axis of said pivot post, selector means adjustable to effect engagement between any selected carrier extension and the universal latch bar, means for swinging the latch bar to swing the selected carrier outwardly to delivering position, rigid means underlying each of the extensions for supporting the same at a point beyond the pivot post to prevent sagging of the carriers, a turntable and supporting and elevating means therefor adapted to raise and lower the turntable throughout the delivering planes of all of the record carriers, and needle carrying means cooperating with the turntable.

26. In phonographic mechanism of the class described, the combination of a set of open record carriers each configured to afford edge support for a record, each carrier having an extension from one edge thereof for normally supporting the carriers in column relation, a vertical pivot post common to all the extensions for pivoting all of the carriers in coaxial alignment, a universal latch bar having upper and lower arms pivoted at their inner ends substantially concentrically with the pivot post to afford swinging movements of the latch bar around the vertical axis of said pivot post, selector means adjustable to effect engagement between any selected carrier extension and the universal latch bar, means for swinging the latch bar to swing the selected carrier outwardly to delivering position, rigid partitions carried by the pivot post and interposed between the extensions and extending outwardly from the pivot post to afford support for the respective extensions to prevent sagging of the carriers, a turntable and supporting and elevating means therefor adapted to raise and lower the turntable throughout the delivering planes of all of the record carriers, and needle carrying means cooperating with the turntable.

27. In phonographic mechanism of the class described, the combination of a set of open record carriers each configured to afford edge support for a record, each carrier having an extension on one edge thereof for normally supporting the carriers in column relation, a vertical pivot common to all of the extensions for pivoting all of the carriers in coaxial alignment, a universal latch bar having upper and lower arms pivoted at their inner ends to swing about the vertical pivot, selector means adjustable to effect engagement between any record carrier extension and the universal latch bar for selecting the record carrier corresponding to the engaged extension, means for swinging the latch bar to swing the selected carrier to delivering position, a turntable and means for rotating the same, link means pivoted at the upper end in relation to the turntable, crank means pivoted to the lower end of the link means, operating mechanism for swinging the crank means to elevate the turntable by upwardly projecting the link means to carry the turntable through the delivering planes of all of the record carriers and bring the turntable to a gradual stop at the end of the upward lift, and needle means coacting with the turntable.

28. In phonographic mechanism of the class described, the combination of a set of open record carriers each configured to afford edge support for a record, each carrier having an extension on one edge thereof for normally supporting the carriers in column relation, a vertical pivot common to all of the extensions for pivoting all of the carriers in coaxial alignment, a universal latch bar having upper and lower arms pivoted at their inner ends to swing about the vertical pivot, selector means adjustable to effect engagement between any record carrier extension and the universal latch bar for selecting the record carrier corresponding to the engaged extension, means for swinging the latch bar to swing the selected carrier to delivering position, rigid means underlying each of the extensions for supporting the same beyond the vertical pivot to prevent sagging of the carriers, a turntable and means for rotating the same, link means pivoted at the upper end in relation to the turntable, crank means pivoted to the lower end of the link means, operating mechanism for swinging the crank means to elevate the turntable through the delivering planes of all of the record carriers and bring the turntable to a gradual stop at the end of the upward lift, and needle means coacting with the turntable.

29. In a phonograph, the combination of a reciprocable turntable, means for reciprocating said turntable between playing and non-playing positions, and means for playing a record at the playing position of said turntable, with a plurality of pivoted record carriers having delivery positions in the path of said reciprocable turntable and normal positions outside of said path, driven means for swinging said pivoted record carriers from said normal positions to said delivery positions, cam operated means for selectively engaging any predetermined record carrier with said driven means to cause swinging of the said predetermined record carrier to its delivery position, and restoring means for afterwards restoring said predetermined record carrier to its normal position.

30. In combination in a phonograph, reproducing means, a reciprocable turntable supporting carriage having playing and non-playing positions, pivotally mounted means laterally removed from the course of said carriage for supporting records, means for selectively placing said records in any sequence in the course of said reciprocable carriage whereby to deliver the records to said carriage for playing by said reproducing means, link means arranged and reciprocating in the projection of the edges of said carriage taken in the direction of its reciprocation and extendible therein for moving said carriage from said non-playing position to said playing position, and driving means for said link means coacting therewith to bring said carriage to a gradual stop at said playing position.

31. In combination in a phonograph, a reproducing device, a turntable, a movable turntable carriage for moving said turntable to and from said reproducing device, reciprocating means beneath said carriage for moving said carriage and said turntable to and from said reproducing device, a plurality of pivoted record carriers adjacent the path of said turntable and swingable to move records into the path of said turntable for delivering records to and receiving the same from said turntable, each said record carrier having an opening therein through which said turntable and said carriage therefor are adapted to pass in the movement of said turntable to and from said reproducing device when said record carrier is swung into the path of said turntable, means for selectively swinging any one of said record carriers into the path of said turntable, and means movable with said carriage for embracing any selected record carrier in the path of said turntable before and after said turntable passes through said opening in its movement to and from said reproducing device.

32. An automatic phonograph having a reciprocable turntable and a plurality of pivoted record carriers swingable between inactive positions laterally removed from said turntable and active positions for delivering records to the path of said turntable, in combination with means for arranging any one of said record carriers in its active position, and guiding means movable with the turntable to engage and center the record carrier in active position with respect to said turntable.

33. In a phonograph, record playing means, a turntable movable to and from said record playing means, a plurality of record carriers movable into and from the path of said turntable, a manually operable selector for selecting said record carriers in any sequence for movement into and from the path of said turntable, a motor, a cam driven by said motor, oscillatable means for moving the selected record carrier to and from the path of said turntable, and means driven by the motor driven cam means for oscillating said oscillatable means and for moving the movable turntable.

34. In an automatic phonograph, the combination of a hub member having a plurality of spaced parallel slots in the periphery thereof providing bearing surfaces, a shaft centrally of said hub member, a plurality of record carriers loosely pivoted on said shaft and extending through said slots outside of said hub member and having supporting engagement with said bearing surfaces, and means for selectively oscillating said record carriers to deliver records for and to remove the same after playing, said bearing surfaces being adapted to support said record carriers throughout their respective paths.

35. In an automatic phonograph, a record supply source, comprising a shaft, cylindrical bearing means arranged coaxially about said shaft and having at a side thereof alternately arranged bearing members and peripheral slots, and a plurality of record carriers each having an arm extending into a said peripheral slot, each said arm being loosely pivoted at one end on said shaft and bearing at its other end on a said bearing member whereby said record carriers are swingable in parallel paths about said shaft.

36. In an automatic phonograph, means for playing a selected record, a shaft for controlling the selection of records, means for rotating said shaft comprising a gear mounted on said shaft, a movable member drivingly engageable with said gear for rotating the same a definite distance in a direction to rotate said shaft, an operating member movable a definite distance for operating said movable member, another shaft having a projection for actuating said operating member, a gear on said other shaft, and rack means for driving said gear to rotate said other shaft whereby said projection actuates said operating member.

37. In an automatic phonograph, a plurality of independently movable record carrier rings, selector means therefor, means for moving the record from a selected ring to a playing position, said means including a reciprocable turntable, a shaft for moving said independently movable record carrier rings, another shaft for controlling the reciprocation of said turntable, means for rotating each of said shafts in timed relationship to position any selected ring in the path of said reciprocable turntable, comprising a drive gear on each said shaft for rotating the same, gear means for driving each drive gear, cam means for actuating said gear means, and means for driving said cam means.

38. In an automatic phonograph, a plurality of independently movable record carrier rings, selector means therefor, means for moving the record from a selected ring to a playing position, said means including a reciprocable turntable, a shaft for moving said independently movable record carrier rings, another shaft for controlling the reciprocation of said turntable, means for rotating each of said shafts in timed relationship to position any selected ring in the path of said reciprocable turntable, comprising a drive gear on each said shaft for rotating the same, gear means for driving each drive gear, a single cam for actuating said gear means, and means for driving said cam.

39. In a phonographic mechanism of the class described, the combination of a plurality of open record carriers, each configured to afford edge support for a record and each having an extension from one side thereof for supporting the carriers, a pivot post common to all of the extensions for pivoting all of the carriers normally in coaxial alignment, means having spaced arms pivoted substantially concentrically with said pivot post to afford swinging movements of said spaced arms about the axis of said pivot post, said means having a member between and swingable with said arms for engaging said extensions, selector means including mechanism adjustable to effect engagement between any selected carrier extension and said member for engaging the same, means for swinging the first said means to swing the selected carrier outwardly to delivering position, a reciprocable turntable, supporting and reciprocating means for the turntable, adapted to reciprocate said turntable throughout the delivering planes of all of the record carriers, and needle carrying means cooperating with the turntable.

40. In combination in a phonograph, reproducing means, a turntable reciprocable between playing and non-playing positions, pivotally mounted means laterally removed from the course of said turntable for supporting records, means for selectively placing said records in any sequence in the path of said turntable whereby to deliver the records to said turntable for playing by said reproducing means, link means arranged in the projection of the edges of said turntable taken in the direction of its reciprocation and extendable therein for moving said turntable from said non-playing position to said playing position at a speed gradually diminishing as said turntable approaches said playing position, and driving means for said link means.

41. A phonograph comprising record playing means, a reciprocable turntable, adapted to move records to and from said record playing means for playing thereby, a plurality of sets of record carriers, each record carrier being movable between a position coaxial with said turntable and an idle position laterally of the first said position, whereby to position a record in and to remove the same from the path of the reciprocable turntable, selector means for selecting a said set of record carriers, and mechanical means for successively moving the record carriers of the selected set between their idle positions and their positions coaxial with said reciprocable turntable, whereby the records in the selected set of carriers are movable by said turntable to and from said record playing means for playing thereby.

42. A phonograph comprising record playing means, a reciprocable turntable, movable to and from said record playing means, a plurality of sets of record carriers, each record carrier being movable between a position coaxial with said turntable and an idle position laterally of the first said position for delivering records to and removing the same from the path of said reciprocable turntable, selector means adapted to select a said set of record carriers and including means for selecting said record carriers of the selected set in a predetermined sequence, and mechanical means for moving any selected record carrier between its idle position and its position coaxial with said reciprocable turntable.

43. In an automatic phonograph, a plurality of movable record carriers, means for playing a selected record, a shaft coacting with said record carriers for controlling the selection of records, means for rotating said shaft comprising gear means mounted on the said shaft, an operative member drivingly engageable with said gear means for rotating the same a definite distance to rotate said shaft, a rock shaft having a projection oscillating therewith for actuating said operating member, gear means on said rock shaft, and driving means engaging the last said gear means for rocking said rock shaft whereby said projection intermittently actuates said operative member.

44. In an automatic phonograph, a plurality of movable record carriers, means for playing a selected record, a shaft coacting with said record carriers for controlling the selection of records, and means for rotating said shaft comprising manually operable drive means for rotating the said shaft a desired distance, gear means mounted on said shaft, an operative member drivingly engageable with said gear means for rotating the same a definite distance to rotate said shaft, a rock shaft having a projection oscillating therewith for actuating said operative member, gear means on said rock shaft, and driving means engaging the last said gear means for rocking said rock shaft whereby said projection actuates said operative member after said manually operable drive means rotates said shaft a desired distance.

45. In an automatic phonograph, a plurality of record carriers movable to record playing position, a turntable, means for selecting the record carriers to be moved to the record playing position, means governed in part by said selecting means for successively moving said record carriers with the records selected to a position above said turntable, means for raising and lowering said turntable, a cam shaft having cam means thereon for operating said means for moving said record carriers and for operating said means for raising and lowering said turntable, means for rotating said cam shaft, means for interrupting the rotation of said cam shaft during each playing period, and automatically operating means for actuating the interrupting means.

46. In a multi-record phonograph including record playing means, a turntable movable to and from operative relationship with said record playing means, and a plurality of superposed record carriers individually swingable in respectively independent, horizontal paths to and from positions in the path of said turntable for cooperation therewith to move records to and from said playing means for playing thereby, a selector apparatus for selectively moving pluralities of record carriers one at a time with records to be played to and from their respective positions in the path of said turntable, comprising record carrier selector means including means operative at positions respectively corresponding to those of the record carriers and means for successively moving the last said means at all of said positions, manually controlled means for predetermining a plurality of records to be played, means cooperating with said manually controlled means for successively operating said record carrier selector means to render it effective at the positions respectively corresponding to the record carriers with the predetermined records one after another, and means for swinging said record carrier selector means to successively swing the selected record carriers with the predetermined records to and from their respective positions over the turntable.

47. In phonographic mechanism of the class described, the combination of a vertical member, a plurality of ring-shaped record carriers mounted on said vertical member to swing about the vertical axis thereof, means mounted on said vertical member for swinging said record carriers about the said axis in one direction, means for selectively engaging any one of the record carriers with the record carrier swinging means to swing the said record carrier in that direction, restoring means universal to all of the record carriers for afterwards restoring the selected record carrier to normal position, a rotatable and reciprocable turntable, and means for raising and lowering the turntable through the position occupied by the selected record carrier when swung in the first said direction to lift the record from the selected record carrier and afterwards to restore it to the same, and means for playing the record when lifted.

48. In phonographic mechanism of the class described, the combination of a substantially vertical member, a plurality of ring-shaped record carriers mounted on said vertical member to swing about the vertical axis thereof, means mounted on said vertical member for swinging said record carriers about said axis in one direction, means for selectively engaging any one of the record carriers with the record carrier swinging means to swing said record carrier in that direction, restoring means for afterwards restoring the selected record carrier to normal position, a rotatable and reciprocable turntable, means for raising and lowering the turntable through the position occupied by the selected record carrier when swung in the first said direction to lift the record from the selected record carrier and afterwards to restore it to the same, means for playing the record when lifted, and automatic means for timing the operations of the record carriers and turntable to cause the swinging of the selected record carrier in the first said direction, the subsequent lifting and lowering of the turntable, and the ultimate restoring of the selected record carrier to normal position.

49. In phonographic mechanism of the class described, the combination of a vertical member, a set of ring-shaped record carriers mounted on said vertical member to swing about the vertical axis thereof, means for swinging said record carriers about said axis in one direction, means for selectively engaging a predetermined plurality of said record carriers one at a time with the record carrier swinging means to cause the successive swinging of each of the predetermined plurality of record carriers in that direction, restoring means for afterwards restoring the selected record carriers to their normal positions, a rotatable and reciprocable turntable, means for raising and lowering the turntable through the positions occupied by the selected record carriers when swung in the first said direction to lift the record from each of the predetermined plurality of record carriers and afterwards to restore it to the same, means for playing the records when lifted, and automatic means for timing the operations of the record carriers and turntable to cause the swinging of the selected record carriers in the first said direction, the subsequent lifting and lowering of the turntable, and the restoring of each selected record carrier to normal position.

50. In phonographic mechanism of the class described, the combination of a plurality of open record carriers, each configured to afford edge support for a record, each carrier having an extension from one edge thereof for normally supporting the carriers in column relation, a vertical pivot post common to all the extensions for pivoting all of the carriers in coaxial alignment, a bar having an arm mounted at its inner end on the pivot post to afford swinging movements of said bar about the vertical axis of said pivot post, selector means including a manually controlled mechanical mechanism adjustable to effect engagement between said bar and a predetermined plurality of carrier extensions one at a time, cam driven means for swinging said bar to swing the selected carriers outwardly one at a time to delivery positions, a turntable, and supporting and elevating means therefor adapted to raise and lower the turntable throughout the delivery positions of all of the record carriers, and needle carrying means cooperating with the turntable.

51. In a phonograph, the combination of a reciprocable turntable, means for reciprocating said turntable between playing and non-playing positions, and means for playing a record at the playing position of said turntable, with a plurality of pivoted record carriers having delivery positions in the path of said reciprocable turntable and normal positions outside of said path, driven means for swinging said pivoted record carriers from said normal positions to said delivery positions, cam operated means for selectively engaging a plurality of predetermined record carriers one at a time with said driven means to cause swinging of the said predetermined record carriers to their delivery positions, and restoring means for restoring each said predetermined record carrier to its normal position before the next said predetermined record carrier is swung to its delivery position.

52. In a phonographic mechanism of the class described, the combination of a plurality of open record carriers each configured to afford edge support for a record and each having an extension from one side thereof for supporting the carriers, a pivot post common to all of the extensions for pivoting all of the carriers normally in coaxial alignment, means pivoted to swing about the axis of said pivot post for engaging said extensions, selector means including mechanism adjustable to effect engagement between a predetermined plurality of carrier extensions one at a time and said member for engaging the same, means for swinging the first said means to swing the record carriers having the predetermined plurality of extensions one at a time outwardly to delivery positions, a reciprocable turntable, supporting and reciprocating means for the turntable adapted to reciprocate said turntable throughout the delivery positions of all of the record carriers, and needle carrying means cooperating with the turntable.

53. In an automatic phonograph, a plurality of record carriers, a turntable, a selector means operable in advance of playing for predetermining a plurality of records to be played, means governed by said selector means for successively moving the record carriers with the predetermined plurality of records to a position above said turntable, means for raising said turntable to pick up the predetermined records on said record carriers to play the same, means for rotating said turntable, and means for actuating said foregoing means.

54. In an automatic phonograph, a plurality of record carriers, a turntable, selector means operable in advance of playing for predetermining a plurality of records to be played, means governed by said selector means for successively moving the record carriers with the predetermined plurality of records to a position above said turntable, means for mounting the record carrier moving means and said record carriers for movement about a common axis, means for raising said turntable to pick up the predetermined records on said record carriers to play the same, means for rotating said turntable, and means for actuating said foregoing means.

55. In an automatic phonograph, a plurality of record carriers, a turntable, a sound pick-up, means for causing the records on said record carriers normally to be played in rotation, selector means for predetermining a plurality of records to be played, means governed in part by said selector means for successively moving the record carriers with the predetermined plurality of records to a position above said turntable, means for raising said turntable to pick up the predetermined records on said record carriers to move them into playing engagement with said sound pick-up, means for rotating said turntable, automatically operating means for returning said sound pick-up to its original position, and means for controlling the operation of said foregoing means.

56. In an automatic phonograph, a plurality of record carriers, a turntable, a sound pick-up, means for causing the records on said record carriers normally to be played in rotation, selector means for predetermining a plurality of records to be played, means governed in part by said selector means for successively moving the record carriers with the predetermined plurality of records to a position above said turntable, means for mounting the record carrier moving means for movement alongside of and parallel to that of said record carriers, means for raising said turntable to pick up the predetermined records on said record carriers to move them into playing engagement with said sound pick-up, means for rotating said turntable, automatically operating means for returning said sound pick-up to its original position, and means for controlling the operation of said foregoing means.

57. In an automatic phonograph, a plurality of record carriers, a turntable, selector means for predetermining a plurality of records to be played, means governed in part by said selector means for successively moving the record carriers with the predetermined plurality of records to a position above said turntable, means for raising and lowering said turntable to move the predetermined records from the record carriers to play the same and to return them to the record carriers, a cam shaft having cam means thereon for operating said means for moving said record carriers and for operating said means for raising and lowering said turntable, and means for rotating said cam shaft.

58. In an automatic phonograph, a plurality of record carriers, a turntable, selector means for predetermining a plurality of records to be played, means governed in part by said selector means for successively moving the record carriers with the predetermined plurality of records to a position above said turntable, means for mounting the record carrier moving means for movement alongside of and parallel to that of said record carriers, means for raising and lowering said turntable to move the predetermined records from the record carriers to play the same and to return them to the record carriers, a cam shaft having cam means thereon for operating said means for moving said record carriers and for operating said means for raising and lowering said turntable, and means for rotating said cam shaft.

59. In an automatic phonograph with a record reproducer and a playing record support, record receiving means for receiving a plurality of records in a storage position laterally spaced from said record support, said receiving means including pivoted means for carrying the records between the storage position thereof and an operative position relative to said record support, means for operating said pivoted means to move any predetermined plurality of successive records one at a time to the operative position relative to said record support, and selector means operable in advance of playing and in part controlling the operating means aforesaid for predetermining any plurality of successive records to be played.

60. In an automatic phonograph, a plurality of record carriers, a movable turntable, individually movable means corresponding in number to the record carriers for successively selecting a plurality of record carriers with the records to be played, means operable in advance of playing for predetermining the record carriers to be selected by said individually movable means, means cooperating with said individually movable means for successively moving the record carriers with the selected records to a position above said turntable, means for raising and lowering said turntable to remove the selected records from said record carriers when moved to said position above the turntable to play said selected records and to return the same to said record carriers after playing, a shaft, and cam means on said shaft for operating said means for moving said record carriers and for operating said means for raising and lowering said turntable.

61. In an automatic phonograph, a turntable, a plurality of record carriers, record carrier mounting means on which an end of each said record carrier is pivoted whereby said record carriers are swingable into and out of an operative position relative to said turntable, means for supporting said record carriers on said mounting means against vertical displacement, record carrier swinging means mounted to swing about the axis of said mounting means, and selector means for coupling each said record carrier with said record carrier swinging means to select the record to be played.

62. In an automatic phonograph, a turntable, a plurality of record carriers, record carrier mounting means on which an end of each said record carrier is pivoted whereby said record carriers are swingable into and out of an operative position relative to said turntable, means for supporting said record carriers on said mounting means against vertical displacement, record carrier swinging means mounted to swing about the axis of said mounting means, selector means for coupling any of a plurality of said record carriers successively with said record carrier swinging means, and means operable in advance of playing for predetermining the record carriers to be successively coupled with said swinging means.

63. In an automatic phonograph, a turntable, a plurality of record carriers, record carrier mounting means on which an end of each said record carrier is pivoted whereby said record carriers are superposed and are adapted to swing laterally to a position above said turntable, record carrier swinging means mounted to swing about the axis of said record carrier mounting means, and including means operative at a plurality of elevations respectively corresponding to said record carriers for swinging them to a position above said turntable, and means for moving said record carrier swinging means about the axis of said mounting means to move a record carrier to a position above said turntable.

64. In an automatic phonograph, a turntable, a plurality of record carriers, record carrier mounting means on which an end of each said record carrier is pivoted whereby said record carriers are superposed and are adapted to swing laterally to a position above said turntable, record carrier swinging means mounted to swing about the axis of said record carrier mounting means, and including means operative at a plurality of elevations respectively corresponding to said record carriers for swinging them to a position above said turntable, means operable in advance of playing for predetermining more than one of said elevations, means for successively rendering said record carrier swinging means effective at the predetermined elevations, and means for moving said record carrier swinging means about the axis of said mounting means to successively move the record carriers corresponding to said predetermined elevations to a position above said turntable.

65. In an automatic phonograph, a turntable, a plurality of record carriers, record carrier mounting means on which an end of each said record carrier is pivoted whereby said record carriers are in substantial vertical alignment, means for supporting said record carriers on said mounting means against axial displacement along said mounting means, record carrier swinging means disposed alongside the pivoted ends of said record carriers and including swingable means mounted on said record carrier mounting means and means operative at a plurality of elevations respectively corresponding to said record carriers and movable with said swingable means for swinging said record carriers to a position above said turntable, and automatic means for actuating said record carrier swinging means to swing a record carrier to a position above said turntable.

66. In an automatic phonograph, a turntable, a plurality of record carriers, record carrier mounting means on which an end of each said carrier is pivoted whereby said record carriers are in substantial vertical alignment, means for supporting said record carriers on said mounting means against axial displacement along said mounting means, record carrier swinging means disposed alongside the pivoted ends of said record carriers and including means operative at a plurality of elevations respectively corresponding to said record carriers for swinging them to a position above said turntable, means operable in advance of playing for predetermining more than one of said elevations, means for successively rendering said record carrier swinging means effective at the predetermined elevations, and automatic means for actuating said record carrier swinging means to successively swing the record carriers corresponding to the predetermined elevations to a position above said turntable.

67. In an automatic phonograph, a turntable, a plurality of record carriers, record carrier mounting means on which an end of each said record carrier is pivoted whereby said record carriers are in substantial vertical alignment, record carrier swinging means operative at a plurality of positions respectively corresponding to said record carriers and swingable about the pivot of said record carriers, automatically operable means including means swingable about said pivot for moving said record carrier swinging means to swing a record carrier to a position above said turntable, automatic means for returning said record carrier to its position of substantially vertical alignment relative to the other said record carriers, and means for supporting said record carriers on said mounting means against vertical displacement and for limiting the pivotal movement of said record carriers in each direction.

68. In an automatic phonograph, a turntable, a plurality of record carriers, record carrier mounting means on which an end of each said record carrier is pivoted whereby said record carriers are in substantial vertical alignment, record carrier swinging means operative at a plurality of positions respectively corresponding to said record carriers, means operable in advance of playing for predetermining more than one of said positions, means for successively rendering said record carrier swinging means effective at the predetermined positions, automatically operable means for moving said record carrier swinging means to successively swing the record carriers corresponding to the predetermined positions to a position above said turntable, automatic means for returning said record carriers to normal position, and means for supporting said record carriers on said mounting means against vertical displacement and for limiting the pivotal movement of said record carriers in each direction.

69. In an automatic phonograph, record reproducing means, a turntable, means mounting said turntable for vertical movement toward and away from and for support at said reproducing means, means for raising and lowering said turntable into and out of operative relation with said reproducing means, a plurality of record carriers, record carrier mounting means on which an end of each said record carrier is pivoted whereby said record carriers are selectively swingable laterally to and from an operative position relative to said turntable, said turntable during the vertical movement thereof toward said reproducing means being adapted to pick up the record from a said record carrier while it is in its operative position, record carrier swinging means movable about the record carrier axis and including means operative at a plurality of elevated positions respectively corresponding to said record carriers for swinging them to a position over said turntable, and means for actuating said record carrier swinging means to selectively swing the record carriers to a position over said turntable.

70. In an automatic phonograph, record reproducing means, a turntable, means mounting said turntable for vertical movement toward and away from and for support at said reproducing means, means for raising and lowering said turntable into and out of operative relation with said reproducing means, a plurality of record carriers, record carrier mounting means on which an end of each said record carrier is pivoted whereby said record carriers are selectively swingable laterally to and from an operative position relative to said turntable, said turntable during the vertical movement thereof toward said reproducing means being adapted to pick up the record from a said record carrier while it is in its operative position, record carrier swinging means movable about the record carrier axis and including means operative at a plurality of elevated positions respectively corresponding to said record carriers for swinging them to a position over the turntable, means operable in advance of playing for predetermining one or more of said elevated positions, means for rendering said record carrier swinging means effective at each of the predetermined elevated positions, and means for actuating said record carrier swinging means to swing each record carrier corresponding to a predetermined elevated position to a position over said turntable.

71. In a mechanism of the character disclosed, the combination of a turntable, a plurality of record carriers, record carrier mounting means on which each said record carrier is mounted to swing into and out of operative position relative to said turntable, selector means including swingable means mounted on said record carrier mounting means and operable means operative at a plurality of positions respectively corresponding to said record carriers to drivingly connect a selected one of said record carriers with said swingable means for swinging a record carrier from an inoperative position to an operative position relative to said turntable, means for operating said operable means to drivingly connect said swingable means with a preselected record carrier, and means for actuating said selector means to swing the pre-selected record carrier to an operative position relative to said turntable.

PAUL H. SMYTH, Jr.

CERTIFICATE OF CORRECTION.

Reissue No. 20,818. August 2, 1938.

PAUL H. SMYTH, JR.

It is hereby certified that error appears in the printed specification of the above numbered patent requiring correction as follows: In the heading to the printed specification, line 6-7, for the renewal date "November 24, 1936" read November 24, 1933; page 1, first column, line 51, before the word "enlarged" insert an; page 2, first column, line 34 for "shaft 62" read shafts 62; page 4, first column, line 12, for "coil" read coin; line 23, after "mecnanism" strike out the comma and insert instead a parenthesis; page 5, second column, line 44, claim 3, before "ultimate" insert the; page 6, first column, line 55, claim 7, for "selected" read selector; and that the said Letters Patent should be read with this correction therein that the same may conform to the record of the case in the Patent Office.

Signed and sealed this 4th day of October, A. D. 1938.

Henry Van Arsdale (Seal) Acting Commissioner of Patents.